United States Patent
Trifoni et al.

(10) Patent No.: US 11,014,208 B2
(45) Date of Patent: May 25, 2021

(54) TOOL SYSTEM AND METHOD OF OPERATION OF SAID TOOL SYSTEM

(71) Applicant: SPRINGA S.r.L., Milan (IT)

(72) Inventors: Alessandro Trifoni, Bologna (IT); Davide Cevoli, Castel Maggiore (IT); Lorenzo Frangi, Barlassina (IT)

(73) Assignee: SPRINGA S.r.L., Milan (IT)

( * ) Notice: Subject to any disclaimer, the term of this patent is extended or adjusted under 35 U.S.C. 154(b) by 214 days.

(21) Appl. No.: 15/982,421

(22) Filed: May 17, 2018

(65) Prior Publication Data
US 2018/0333816 A1    Nov. 22, 2018

(30) Foreign Application Priority Data

May 19, 2017  (EP) ..................... 17172084

(51) Int. Cl.
| | | |
|---|---|---|
| *B23Q 9/00* | (2006.01) | |
| *G01B 5/004* | (2006.01) | |
| *G01B 3/11* | (2006.01) | |
| *B23Q 17/22* | (2006.01) | |
| *B23Q 17/24* | (2006.01) | |
| *G05B 19/409* | (2006.01) | |
| *B60B 19/12* | (2006.01) | |

(52) U.S. Cl.
CPC .......... *B23Q 9/0007* (2013.01); *B23Q 17/22* (2013.01); *B23Q 17/2414* (2013.01); *G01B 3/11* (2013.01); *G01B 5/004* (2013.01); *G05B 19/409* (2013.01); *B60B 19/125* (2013.01); *Y10T 29/5176* (2015.01); *Y10T 409/306384* (2015.01)

(58) Field of Classification Search
CPC .......... Y10T 29/5176; Y10T 408/5612; Y10T 409/306384; Y10T 409/30644; B24B 23/08; B23Q 9/00–0057; B23Q 17/22; B23Q 17/2233–2275

USPC ............ 451/344–359; 409/178, 179; 408/88; 224/401; 29/56.5

See application file for complete search history.

(56) References Cited

U.S. PATENT DOCUMENTS

| | | | | |
|---|---|---|---|---|
| 5,468,099 | A | * 11/1995 | Wheetley | ................ B23B 39/04 180/8.1 |
| 6,129,489 | A | * 10/2000 | Linderholm | ....... B23K 37/0217 408/76 |
| 8,739,426 | B1 | * 6/2014 | Freed | ........................ G01B 3/10 33/756 |
| 9,221,506 | B1 | * 12/2015 | Georgeson | ............... G05D 1/00 |
| 2003/0108395 | A1 | * 6/2003 | Douglas | ................... B23Q 9/02 408/76 |
| 2009/0313844 | A1 | 12/2009 | Swanson et al. | |
| 2010/0198543 | A1 | 8/2010 | Teune | |
| 2015/0003927 | A1 | * 1/2015 | Spishak | ............... G05D 1/0261 408/1 R |
| 2017/0043418 | A1 | * 2/2017 | Pierce | .................. B23Q 9/0007 |
| 2018/0215573 | A1 | * 8/2018 | Tarasinski | .............. B65H 57/14 |

FOREIGN PATENT DOCUMENTS

| | | | | |
|---|---|---|---|---|
| DE | 102005058493 A1 | * 6/2007 | .......... | B23Q 9/0007 |
| DE | 10 2006 040 155 A1 | 2/2008 | | |
| WO | 2016/051342 A1 | 4/2016 | | |

* cited by examiner

Primary Examiner — Erica E Cadugan
Assistant Examiner — Michael Vitale
(74) *Attorney, Agent, or Firm* — Vorys, Sater, Seymour & Pease (57) ABSTRACT

Provided is a tool system for including a machine tool configured for machining by the removal of material an object defining a machining surface.

11 Claims, 7 Drawing Sheets

*Fig. 10b*

TOOL SYSTEM AND METHOD OF OPERATION OF SAID TOOL SYSTEM

FIELD OF THE INVENTION

The present invention relates to a tool system and method of operation of said tool system of the type comprising a machine tool suitable for machining by the removal of material an object defining a machining surface, wherein the machine tool comprises a tool, driving means suitable to be placed directly in contact with the machining surface and to move the machine tool and, thus, the removal tool, with respect to the object while the removal tool removes material from the object, and a control unit for controlling the driving means.

In particular, the device which the present invention relates to is a system in which the movement of a machine tool during machining is directed by a computer which controls its movements and functions according to a clearly-defined work programme.

DESCRIPTION OF THE PRIOR ART

As known, machine tools divide depending on the type of machining or tool into lathes, drills, sanders, milling machines, and usually include a piece-holder table which the object to be machined is connected to and a spindle which the tool for performing the work is joined to.

The operation of such machines requires that the operator puts the object on the piece-holder table, connects a tool to the spindle, performs the relative positioning of the spindle and tool, starts the spindle and, then, moves the object to be machined and/or the spindle along a straight guide.

The prior art described has several significant drawbacks.

A first disadvantage is that to make non-rectilinear shapes or profiles, the movement of the tool or workpiece is performed manually by the operator who must thus have high dexterity and experience.

Another drawback is the high risk of danger and, therefore, the fact that the operator may seriously injure him/herself.

This problem is further increased by the fact that the safety guard is often removed to improve the visibility of the cut or blade.

Another drawback is that the operator, to perform different types of machining, is forced to both buy several machines, increasing production costs and to move the object between the different machines, increasing processing times.

To solve the aforementioned problems CNC machines are increasingly used which identify a base station on which to perform different machining without moving the object to work on.

CNC machines have a protective casing that contains the various components and defines a machining chamber; an interface external to the casing by means of which to define the machining to be performed; a piece loading system designed to introduce and extract the object to be machined from the chamber; several spindles on which the machining tools are mounted; and tool changer systems.

The spindles are lastly fitted with a driving system which by translating or rotating the spindle in relation to the object permits the performance of a chosen machining.

These machines, although representing an improvement compared to the traditional machine tools described above, have some major drawbacks.

One important drawback is the limited size of an object worked with these machines since, having to be inserted in the machining chamber, they cannot have large dimensions.

Another drawback is that CNC machines have a highly complex construction and, therefore, a high purchase and maintenance cost.

Another drawback is the high energy consumption of such machines, which, together with the aforesaid high purchase and maintenance costs, make the pieces produced this way particularly expensive.

Another drawback is that the CNC machines require the operator to have an advanced knowledge of the machine and of the programming language and are thus complex to program and use.

The machine tool described in the patent application WO-A-2016051342 describes a device able to partially overcome the aforementioned drawbacks.

In particular, the device is characterised in that it is small and is situated above the part being machined without limitations as regards the size of the part and without creating visual obstacles with reference to the machining path.

Such device makes it possible to follow a pre-set machining path or to set the machining parameters in real time so as to guide the device along the surface of the part subject to machining.

The aforementioned technique however has at least one further significant drawback.

The device described in the patent application WO-A-2016051342 allows a generic user to guide said device on the basis of "absolute" type indications and parameters.

The term absolute is understood to mean that any distance covered in terms of direction and intensity refers solely to a starting point or reference system coinciding with the point in which the device is first placed by the user for machining. There is however no reference with respect to the reference system defined by the part being machined and therefore it is not possible to operate the tool in relation to the support surface.

The lack of information relative to the surface of the part being machined thus makes it impossible to automatically determine the position of the device on the work surface.

SUMMARY OF THE INVENTION

In this situation, the technical purpose of the present invention is to devise a tool system and method of operation of said tool system able to substantially overcome at least some of the drawbacks mentioned above.

Within the sphere of said technical purpose one important aim of the invention is to obtain a tool system having reduced purchase, maintenance and running costs.

Another important aim of the invention is to make a machine system of reduced size.

A further purpose of the invention is to develop a tool system and method of operation of the same which can easily and safely perform any cutting profile on an object of any size.

In conclusion, another purpose of the invention is to make a tool system and method of operation of said tool system which makes it possible to move and localize said machine on the work surface.

The technical purpose and specified aims are achieved by a tool system comprising a machine tool suitable for machining by the removal of material an object defining a machining surface, wherein the machine tool comprises a tool, driving means suitable to be placed directly in contact with the machining surface while the tool works on the object, a control unit suitable to control the driving means, and wherein the system further comprises at least one localization apparatus comprising a support portion and a localization portion, wherein the support portion is suitable to be placed at a fixed point of said machining surface and the localization portion is connected to the machine tool by means of a cable suitable to allow the localization of the machine tool on the machining surface.

BRIEF DESCRIPTION OF THE DRAWINGS

The characteristics and advantages of the invention are clearly evident from the following detailed description of preferred embodiments thereof, with reference to the appended drawings, in which:

FIG. 6a shows a side view of the localization apparatus according to the invention;

FIG. 6b shows an axonometric view of the localization apparatus according to the invention;

FIG. 6 c shows a detail of the release element according to the invention;

DESCRIPTION OF THE PREFERRED EMBODIMENTS

Herein, the measures, values, shapes and geometric references (such as perpendicularity and parallelism), when used with words like "about" or other similar terms such as "approximately" or "substantially", are to be understood as except for measurement errors or inaccuracies due to production and/or manufacturing errors and, above all, except for a slight divergence from the value, measure, shape or geometric reference which it is associated with. For example, said terms, if associated with a value, preferably indicate a divergence of not more than 10% of said value.

In addition, where used terms such as "first", "second", "upper", "lower", "main" and "secondary" do not necessarily refer to an order, a priority relationship or relative position, but may simply be used to more clearly distinguish different components from each other.

The measurements and data presented herein are considered, unless otherwise indicated, as performed in International Standard Atmosphere ICAO (ISO 2533).

With reference to the Drawings, reference numeral 1 globally denotes the tool system according to the invention.

The tool system 1 thus preferably comprises a machine tool 1a and at least one localization apparatus 1b.

The machine tool 1a is preferably suitable to be used to remove or add material from/to a machining surface 10a, preferably substantially flat, of an object 10 to perform machining such as channels, holes, grooves and/or to cut said object or design shapes on said object or even colour parts thereof. In particular, the object 10 is a sheet, preferably of wood. The object 10 or workpiece thus has surface dimensions generally less than 100 m$^2$.

The object 10 may be in wood, paper, cardboard, fabric or metal.

The machine tool 1a thus comprises at least one removal tool 2; driving means 3 suitable to be placed in direct contact with the surface 10a and to move the removal tool 2 and the machine tool 1a with respect to the object 10; a casing 4 to which the removal tool 2 and the means 3 are associated; and a power supply (a battery and/or cables to connect to an external network) suitable to power the components of the machine tool 1a.

The removal tool 2 is thus a cutting and/or drilling tool suitable to remove material by melting, evaporation, or preferably, by means of chip removal. It can thus be a rotating, alternating or laser tool, waterjet or otherwise. It is preferably a small tool, namely a tool which removes material in a surface area less than dm$^2$, preferably than cm$^2$.

The object 10 is thus in direct contact and supports the driving means 3 during the machining and the exchange of forces during machining takes place directly between the object 10 and driving means 3.

It may include a stator part 21; a spindle 22, preferably an electric spindle, defining a working axis 22a; and a tool 23 suitable to be connected to the spindle 22 so as to rotate around the work axis 22a performing the removal of material.

The tool 23 may be a drill bit and, thus, the removal tool 2 may be a drill. Alternatively, the tool 23 may be a cutter and, thus, the removal tool 2 may be a milling machine.

The driving means 3 comprise drive wheels defining a main axis of rotation 3a and the machine tool 1a has a control unit 5 suitable to control at least the removal tool 2 and, thus, the removal, and the drive wheel and, thus, the movement of the machine tool 1a along a removal path 2a along which the removal of material is performed.

It can be seen how, if fitted with a control unit, the machine tool 1a is identifiable in a numerical control machine tool.

Furthermore, the control unit 5 does not provide for operators on board the machine tool 1a, given that it is too small, since it machines an object 10, to accommodate an operator.

Preferably, the driving means 3 include a plurality of drive wheels and, more precisely, three drive wheels having main rotation axes 3a mutually almost equally angularly spaced at approximately 120°.

Each drive wheel includes a base body 31, preferably virtually cylindrical, having an extension axis almost coinciding with the axis of rotation 3a and suitable to rotate about the same axis 3a; rolling elements 32 idly hinged to the side surface of the base body 31 so as to come between the body 31 and surface 10a and, thus come into direct contact with said surface 10a, a motor 33, specifically, electric, suitable to control the rotation of the base body 31 around the axis 3a; and in some instances, an encoder suitable to monitor the motor 33.

The rolling elements 32 hinged to the base body 31 are placed along at least one circumference almost concentric with the axis of rotation 3a and with idle axes of rotation lying on a substantially transverse plane and, in particular, virtually perpendicular, to the main axis of rotation 3a. Preferably, the elements 32 are placed on a plurality of circumferences (specifically three) of equal radius, and, between adjacent circumferences, mutually angularly offset so as to always have a correct contact between rolling elements 32 and the machining surface 10a.

The rolling elements 32 are rollers and, to be precise, tapered or barrel rollers.

Preferably, the drive wheels 3 are so-called "omni wheels", in themselves known.

The casing 4 is suitable to support the various components of the machine tool 1a. It comprises a base plate 41 suitable to be set proximal and parallel to the surface 10a and to which the control unit 5 and driving means 3 are associated; a housing 42 associated to the base plate 41 defining a volume for housing at least the unit 5; and an attachment 43 suitable to connect the removal tool 2 to the casing 4 by placing the working axis 22a suitably virtually perpendicular to the machining surface 10a when the machine tool 1a is working. In some cases, the casing 4 may have handles, protruding from the base plate 41 and/or from the housing 42 from the opposite side to the surface and suitable to allow an operator to operate manually.

The base plate 41 can have dimensions substantially less than 0.5 m and, to be precise, than 0.3 m, while the housing 42 may have a height, measured perpendicular to the base plate 41, substantially less than 0.3 m, to be precise, less than 0.2 m.

The attachment 43 comprises a vertical plate 431 suitable to be set virtually perpendicular to the surface 10a, at least one coupling 432 suitable to connect the stator part 21 to the vertical plate 431 and a horizontal plate 433 suitable to be set almost parallel to the surface 10a and on which the stator part 22a rests and having a through hole 43d at least equal to the cross-section of the spindle 22 so that it and the tool 24 protrude from the horizontal plate 433 facing the object 10.

The coupling 432 is suitably of the clamp type and may provide two contrasting elements 432a, for example substantially C-shaped, suitable to be placed on the opposite side with respect to the stator part 21 and a clamp 432b, for example a bolt, by means of which to tighten the contrast elements 432a to the stator part 21.

In some cases, the machine tool 1a may provide movers between the attachment 43 and the rest of the casing 4 suitable to move the attachment 43 and the removal tool 2 with respect to the rest of the casing 4 and thus to the machining surface 10a.

The movers, not illustrated in the drawing, may provide for a vertical mover suitable to vary the distance of the removal tool 2 from the surface 10a by means of a translation preferably substantially parallel to the work axis 22a; and/or a rotational mover suitable to rotate the remover 2 around an axis substantially parallel to the machining surface 10a and virtually perpendicular to the work axis 22a by varying the angle between the working axis 22a and surface 10a.

The control unit 5 is suitable to control, independently of each other, the driving wheels 3 along the removal path 2a.

It is also suitable to define the removal commanding the movers, and the removal tool 2 and, in particular, the spindle 22 as a function of the removal parameters.

The control unit 5 includes a control board connected to the removal tool 2 and to the driving wheels and provided with a memory and interface means, such as a USB port, by means of which the operator can enter and store in said memory the removal parameters and, in some cases, the path 2a.

It is to be noted that in the memory there is a database associating with any type of advancement (straight, arched, elliptical, etc.), a speed and a direction of rotation for each driving wheel around its main axis of rotation 3a.

The control unit 5 preferably consists of a microcomputer, for example an Arduino® or Raspberry® type microcomputer and may be suitable to be operatively connected and communicate via cable or other means with an external electronic calculator such as, for example, a common computer.

The machine tool 1a further comprises at least one detection apparatus 6.

The detection apparatus 6 is preferably placed on the top of the machine tool 1a.

Moreover, the detection apparatus 6 is suitable to receive or release at least one detection cable 7. Such detection cable may be a polymeric or metallic cable 7 and preferably the detection cable 7 is made of steel.

The detection apparatus 6 is also electrically connected, for example, to the control unit 5 so that it can exchange information with it.

The apparatus 6 defines a first axis 6a. The first axis 6a is preferably an axis around which at least part of said apparatus 6 can rotate.

Consequently the detection apparatus 6 may comprise a shaft 6b centred along the axis 6a and suitable to movably connect some elements around it.

The shaft 6b may, for example, be connected to the casing 4.

In particular the detection cable 7 is preferably suitable to rotate around the shaft 6b or to be at least partially coiled around the shaft 6b.

The apparatus 6 thus preferably comprises a first element 60, a second element 61 and a third element 62.

Preferably the first element 60 is a first portion movably connected to said casing 4, or more appropriately the shaft 6b. The first element 60 may therefore comprise bearings suitable to permit a smooth rotation thereof around the shaft 6b and, in particular, around the first axis 6a. Said first element 60 is preferably a rotating component to which it is possible to connect at least part of a detection cable 7.

In detail the first element 60 is a ring, connectable around its perimeter, to the cable 7.

Preferably the first element 60 is suitable to allow the detection cable 7 to rotate around the shaft 6b and, in particular, around the first axis 6a.

In addition, the first element 60 rotates integrally with the rotation imposed by the cable 7.

Figure 10A:
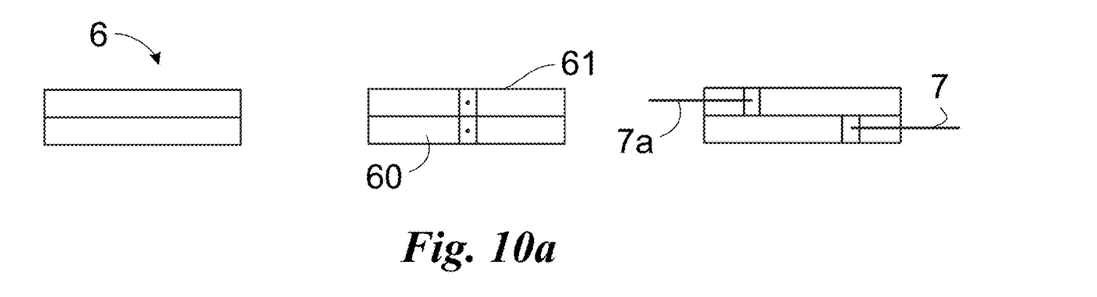
FIG. 10a is a diagram from the front of the detection apparatus in a preferred configuration according to the invention.
Figure 10B:
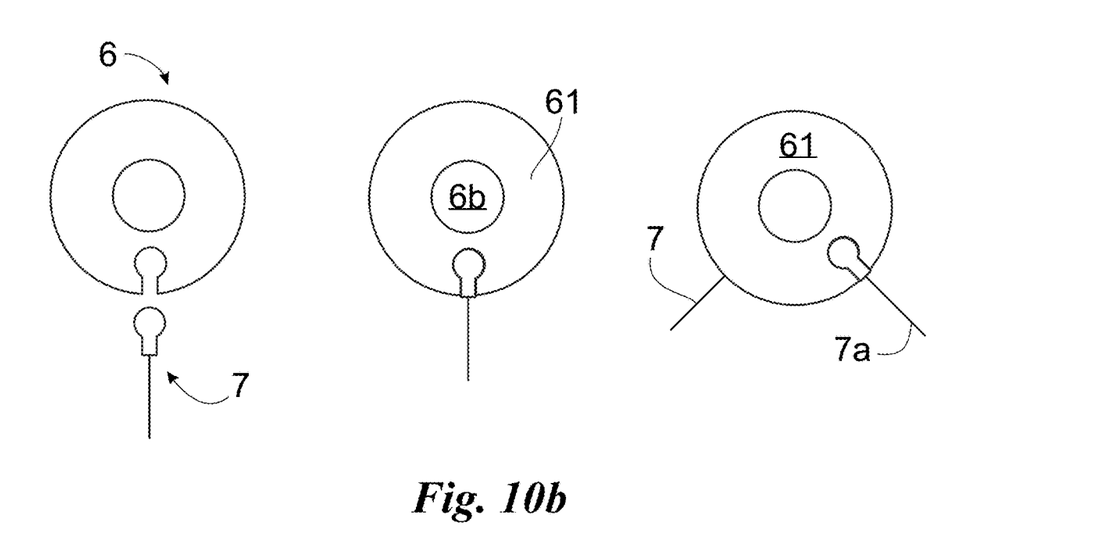
FIG. 10b is a diagram from above of the detection apparatus in a preferred configuration according to the invention.

Preferably, therefore, the cable is 7 detachably connected to the first element 60 in an integral manner. Such connection may be guaranteed, for example, by known releasable interlocks for example shown in FIG. 10b.

The second element 61 preferably has the same features as the first element 60. Said second element 61 could even not be present in the detection apparatus 6 and the latter could be provided with the first and third elements 60, 62 only.

The second element 61, in fact, is therefore an additional element preferably detachably connected to a localization cable 7a.

The localization cable is preferably of the same type as the detection cable 7.

For example, as a result, the second element 61 may also comprise bearings suitable to permit a smooth rotation thereof around the shaft 6b and, in particular, around the first axis 6a.

Preferably the first and second element 60, 61 are therefore moved respectively by the detection cable 7 cable and the localization cable 7a.

Moreover the angle between the two cables 7 and 7a can be measured by sensor means of a known type, able to record the angular deviation α between the elements 60, 61 and, in detail, the cables 7 and 7a.

This information may then be supplied by the sensors to the control means 5.

Consequently the possible sensor means are preferably operatively connected to the control means 5. Such connection can be ensured via standard cable connections or by wireless connections.

This type of sensor means may be an encoder or similar element. Preferably the third element 62 is at least partially connected to the first element 60 in such a way that it can detect the movements of said first element 60.

In particular the third element 62 is suitable to detect the orientation of the machine tool 1a relative to the direction of the cable 7.

In detail, the third element 62 is suitable to detect the angle φ.

The angle φ is preferably the angle between a predetermined direction of the machine tool 1a and the detection cable 7 connected to the first element 60.

Preferably the third element 62 consists of a detector 62a and a disc 62b.

The disc 62b is preferably suitable to be connected to the first element 60 in such a way as to rotate integrally therewith around the shaft 6b and the first axis 6a.

The detector 62a is preferably a sensor, for example optical, suitable to detect the angle of rotation of the disc 62b and consequently of the first element 60.

Consequently the cable 7 connected to the first element 60, rotating integrally with the first element 60, defines a plurality of φ angles with respect to an angle α adjustable via the third element 62.

This fixed point is preferably defined, as mentioned, by a default direction of the machine tool 1a such as, for example, that of advancement when the movers are actuated.

Preferably the third element 62 is substantially an encoder suitable to detect the positions of the disc 62b in relation to the detector 62a.

Consequently the third element 62 is preferably suitable to allow the control unit 5 to detect the orientation of the machine tool 1a relative to the direction of the detection cable 7.

Alternatively the α angle can be measured through the presence of two sensors similar to the third element 62 and suitable to measure angles of both cables 7 and 7a in relation to the fixed point on the device.

In an alternative configuration the first element 60 may be a portion connected to said casing 4, or more appropriately to the shaft 6b.

Such first element 60 is therefore preferably a ring comprising a containment area in which at least part of the detection cable 7 can be housed.

In this configuration the first element 60 is suitable to allow the cable 7 to be coiled or released from the shaft 6b and, in particular, describing circumferences centred along the first axis 6a without being moved.

The second element 61 is preferably movably connected to said casing 4, or more appropriately to the shaft 6b.

For example, the second element 61 may comprise bearings suitable to permit a smooth rotation thereof around the shaft 6b and, in particular, around the first axis 6a.

The second element 61 is also preferably a ring comprising a containment area in which at least part of the detection cable 7 can be housed.

Preferably the first and second element 60, 61 together define, in the alternative configuration, an area between them suitable to hold the cable 1 coiled around the shaft 6b for example.

Preferably the second element 61 is suitable to allow the cable 7 to be coiled around the shaft 6b and, in particular, describe circumferences centred along the first axis 6a.

Unlike the first element 60, the second element 61 is preferably suitable to be moved integrally with the cable 7.

The second element 61 is therefore substantially suitable to be pulled by the cable 7.

As a result, the first and second element 60, 61 preferably define a transmission pulley of the cable 7.

The pulley is therefore composed of a mobile portion, the second element 61, and a fixed portion, the first element 60.

Preferably the third element 62 is at least partially connected to the second element 61 in such a way that it can detect the movements of said second element 61.

In particular the third element 62 is suitable to detect the orientation of the machine tool 1a relative to the direction of the cable 7.

In addition, said third element 62 comprises at least one portion suitable to move integrally with the second element 61.

Preferably the third element 62 consists of a detector 62a and a disc 62b.

The disc 62b is preferably suitable to be connected to the second element 61 in such a way as to rotate integrally therewith around the shaft 6b and the first axis 6a.

The detector 62a is preferably a sensor, for example optical, suitable to detect the angle of rotation of the disc 62b and consequently of the second element 61.

Consequently the cable 7 rotating integrally with the second element defines a plurality of angles with respect to a fixed point adjustable via the third element 62. Preferably the third element 62 is substantially an encoder suitable to detect the positions of the disc 62b in relation to the detector 62a.

Consequently the third element 62 is preferably suitable to allow the control unit 5 to detect the orientation of the machine tool 1a relative to the direction of the cable 7.

The tool system 1 further comprises, as said, at least one localization apparatus 1b.

Such localization apparatus 1b preferably comprises a support portion 9 and a localization portion 8.

The support portion 9 is, for example, the portion of the apparatus 1b suitable to be rested on the top of the object 10 and, more appropriately, the machining surface 10a.

Preferably the support portion 7 therefore comprises at least a base 90 and a pointing device 91.

The base 90 preferably defines at least one support surface 90*a* compatible with the machining surface 10*a*.

Consequently the support surface 90*a* is, for example, a flat surface.

The base 90 may also be composed of different materials such as wood or metal or polymers.

Preferably the base 90 is made of polymethylmethacrylate so as to allow a user to view the support surface 90*a* from outside.

The pointing device 91 preferably comprises an emitter 91*a* suitable to mark one or more points on the support surface 10*a*.

Consequently the emitter 91*a* may comprise a laser device or a plurality of LEDs suitable to focus a light beam 90*b* in one or more points of the support surface 90*a*.

In particular the beam 90*b* defines the positioning centre of the localization apparatus 1*b* with respect to the object 10 and, consequently, the support surface 10*a*.

However the pointing device 91 may consist of a simple target printed on the base 90 so as to allow a user to align the machining surface 10*a* with the lines of the target.

The support portion 9 may also comprise a connection device 92. Such connection device 92 is preferably suitable to enable a detachable connection between the base 90 and the object 10.

Consequently the connection device 92 is for example a vice of the known type suitable to be opened or closed so as to stably attach the localization apparatus 1*b* to the object 10.

The localization portion 8 is instead preferably connected or in one piece with the support portion 9.

Preferably the localization portion 8 defines a tower of a variable height suitable to receive or release at least a detection cable 7 or a localization cable 7*a*.

Moreover, the localization portion 8 is preferably connected to the machine tool 1*a* by means of the cable 7 or 7*a* which is suitable to permit the localization of the machine tool 1*a* on the machining surface 10*a*.

The localization portion 8 further comprises a first device 80, a second device 81 and a third device 82.

Preferably said devices 80, 81, 82 are connected to a frame and are mutually connected by a detection cable 7.

The first device 80 is, for example, an element movably connected to the aforesaid frame and suitable to house at least part of a cable 7, 7*a*.

In particular the first device 80 is suitable to receive or release a cable 7, 7*a* in opposition to or pushed by an elastic element.

Preferably the first device 80 also comprises a sensor suitable to detect the amount of cable 7, 7*a* released or received.

Consequently, preferably the first device 80 comprises a disc-shaped element defining a rotation axis and an elastic element suitable to oppose the movement around the axis of the disc-shaped element.

In this case, for example, the sensor previously mentioned may consist of a revolution counter associated to the disc-shaped element or, more appropriately, an encoder suitable to link the variation of the angle with the actual unwinding of the cable 7, 7*a*.

The sensor may thus be suitable to be operatively connected and to communicate via cable or other means with an external computer.

The second device 81 preferably comprises a transmission device suitable to allow the passage of the cable 7, 7*a* from the first device 80 to a third device 82. Preferably the second device 82 consists of a pulley suitable to rotate integrally with the cable 7, 7*a* placed above it.

Preferably the cable 7, 7*a* is placed above the second device 81 in such a way as to complete at least one revolution around it.

The third device 82 is preferably suitable to allow the release or the receipt of the cable 7, 7*a* by the localization apparatus 1*b*.

It may therefore consist of a hole suitable to allow the passage of the cable 7, 7*a* or other equipment depending on the structural configuration of the localization apparatus 1*b*.

For example, if the localization apparatus 1*b* consists of a frame defining a closed box, the third device may be a hole with a second pulley.

Or, if the structure of the localization apparatus 1*b* is substantially open, the third device 82 may consist of a simple through slot which allows the passage of the cable 7, 7*a* with the correct orientation with respect to the first and second device 80, 81.

In particular the third device 82 is suitable to release or receive the cable 7, 7*a* from a detection apparatus of a machine tool 1*a*.

Consequently the machine tool 1*a* and at least one localization apparatus 1*b* are connected by a detection cable 7 and/or by a localization cable 7*a*.

The localization portion 8 may, in addition, comprise a fourth device 83 and the cable 7, 7*a* may comprise a plurality of markers 70.

The markers 70 are suitable to define local points spaced along the cable 7, 7*a*.

Said device 83 is preferably suitable to detect the markers 70 and to be operatively connected and communicate via cable or other means with an external computer.

Preferably the markers 70 define specific lengths of cable 7, 7*a* and are, therefore, for example equi-distant.

Said markers 70 may consist of ink or other reflective coatings suitable to be detected by the device 83 which may therefore be an optical drive.

The optical drive may also be suitable to be operatively connected and to communicate via cable or other means with an external electronic calculator such as, for example, a computer.

Preferably the sensors of the first and fourth device 80, 83, just as the control unit 5, are connected to an electronic terminal suitable to process the data received from each of the elements.

Consequently, it is possible for example to compare the data related to the release or receipt of cable 7, 7*a* by the first device 80 with the data recorded by the fourth device 83 so as to detect possible errors of measurement occurring during the movement of the machine tool 1*a*.

The above errors may derive from the fact that the local tension on the cable 7, 7*a* varies depending on the movements made by the machine tool 1*a*.

For example, when the machine tool 1*a* moves away from a localization apparatus 1*b* it gives rise to inner tensions higher than when it is moving towards it.

Figure 1:
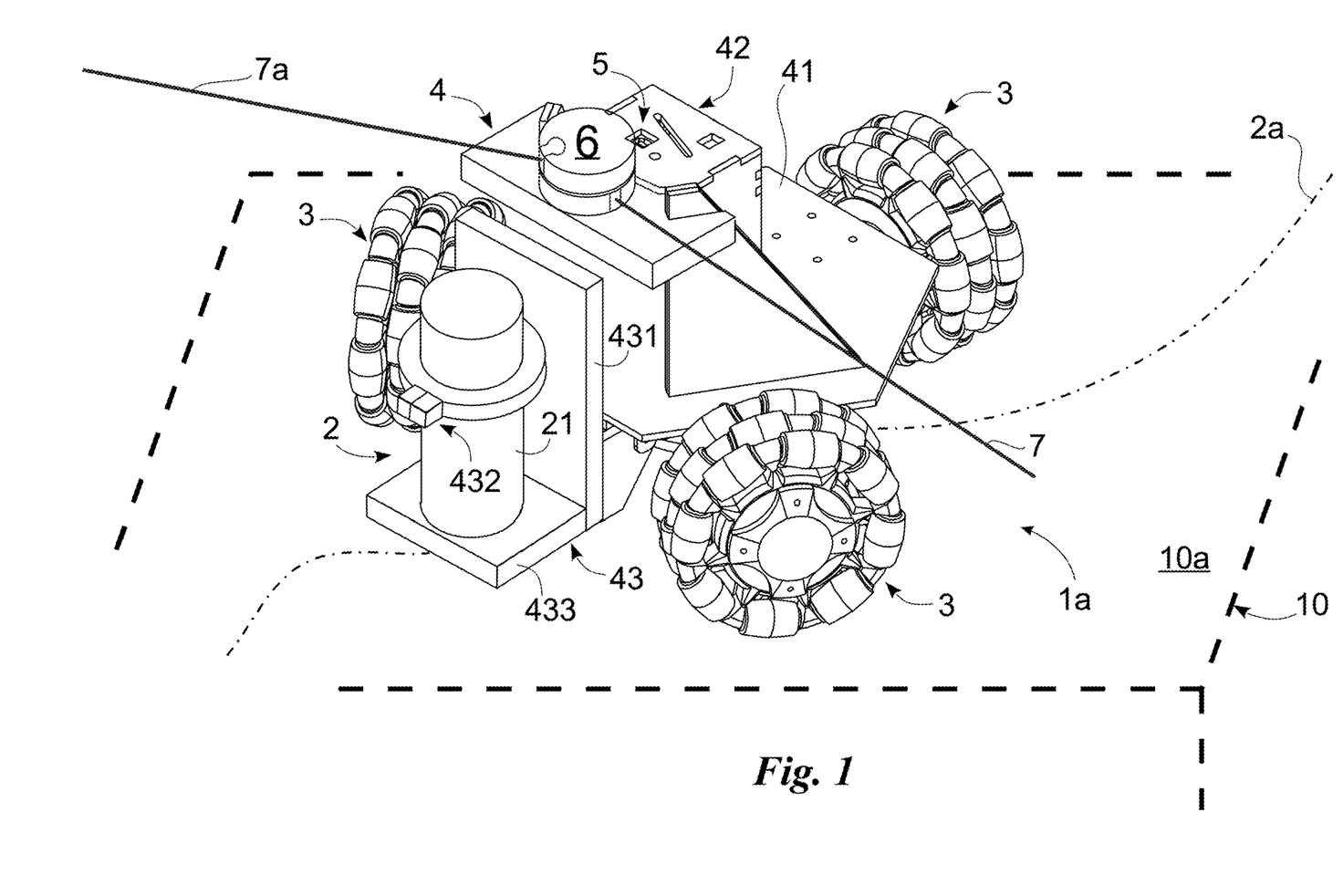
FIG. 1 shows a machine tool in a preferred configuration according to the invention in an axonometric view and during machining.
Figure 2:
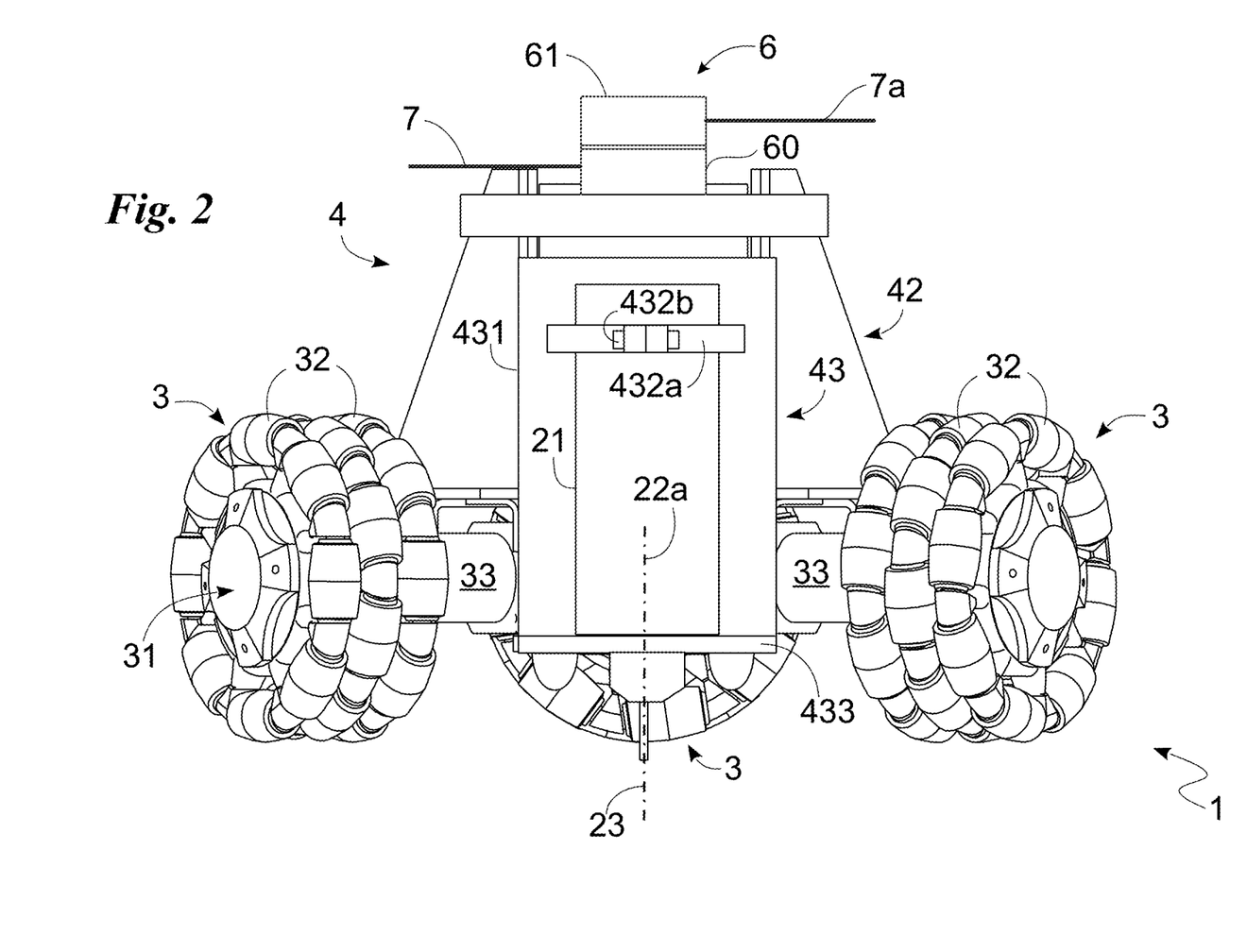
FIG. 2 shows a front view of a machine tool in a preferred configuration according to the invention.
Figure 3:
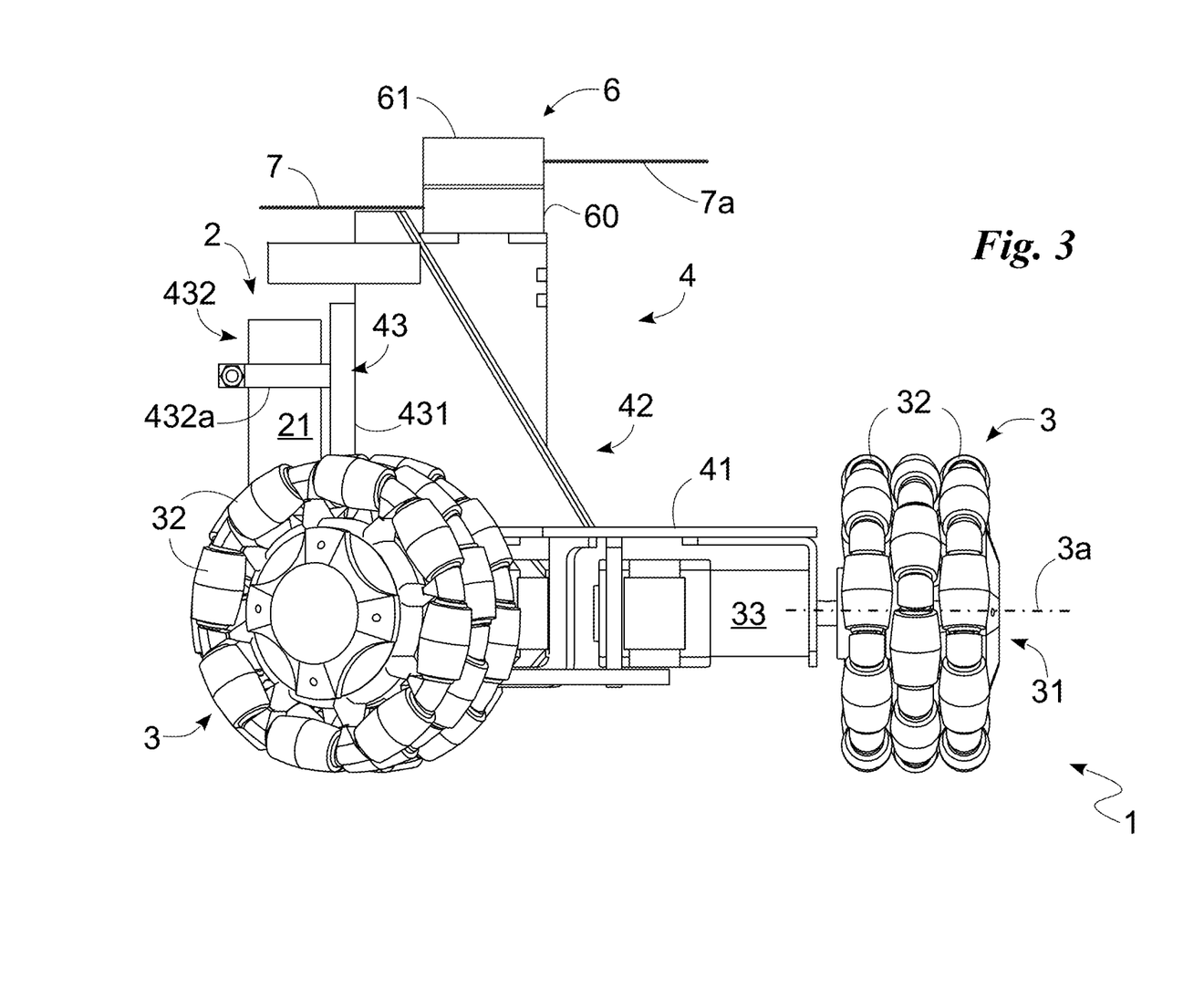
FIG. 3 is a side view of the machine tool in a preferred configuration according to the invention.
Figure 4A:
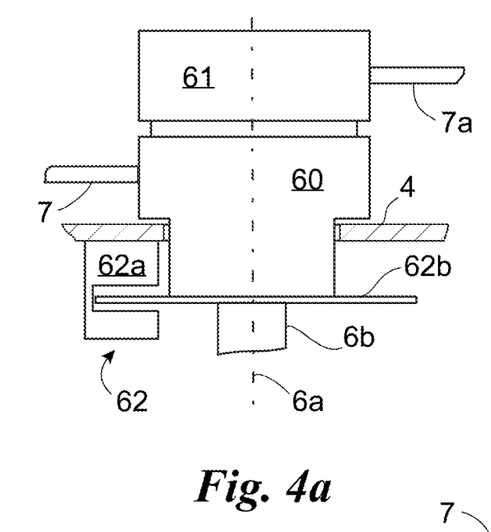
FIG. 4a shows the detection apparatus in detail in a preferred configuration according to the invention.
Figure 4B:
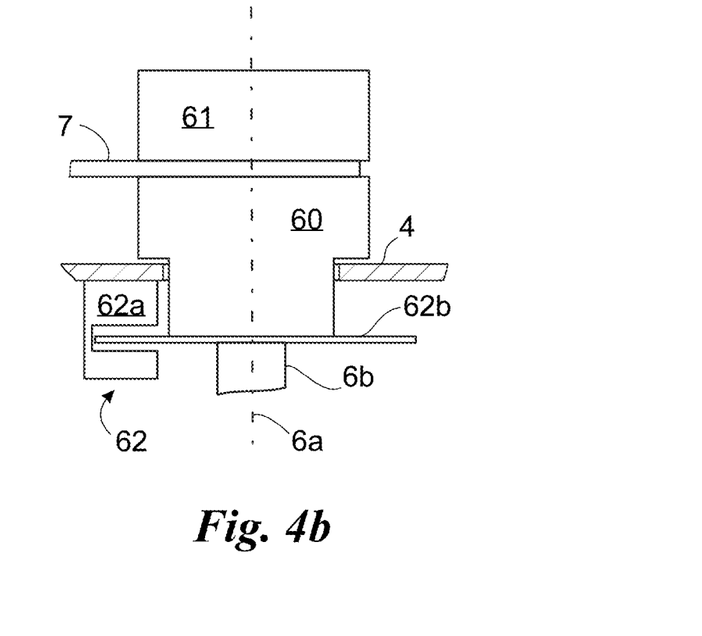
FIG. 4b shows the detection apparatus in detail in an alternative preferred configuration according to the invention.
Figure 5:
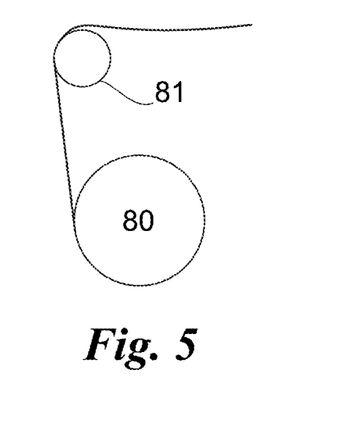
FIG. 5 is an example of a drawback solved by the pulley configuration according to the invention.
Figures 6A, 6B, 6C:
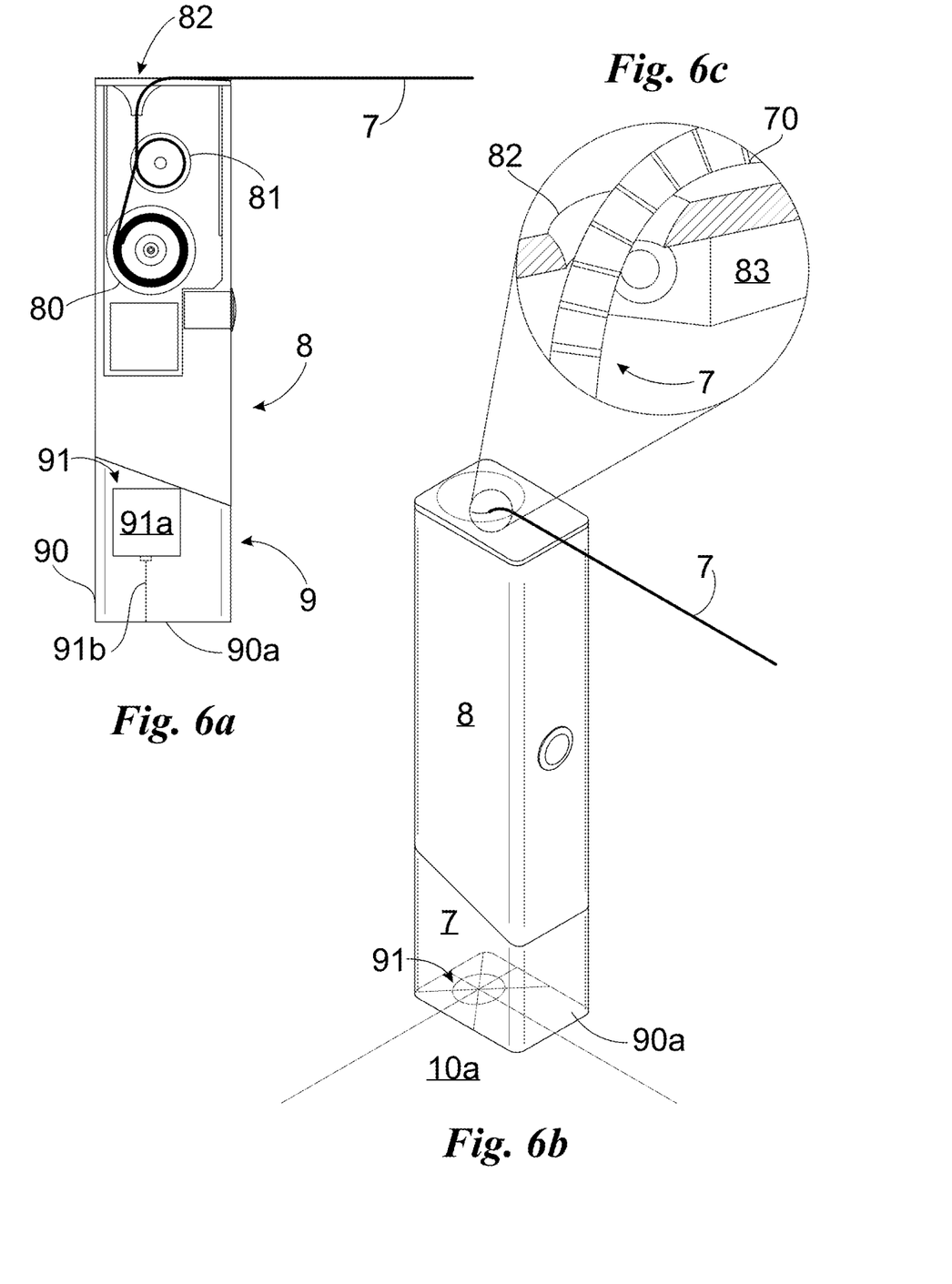

This tension difference, due to the fact that when the cable 7, 7*a* is coiled by the first device 80 it no longer works in opposition to the elastic element of the first device 80, can cause incorrect winding, visible for example in FIG. 5, leading to subsequent measurement errors.

Figure 9A:
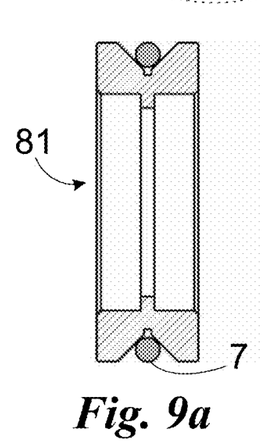
FIG. 9a shows a side view in cross-section of the second device according to the invention.
Figure 9B:
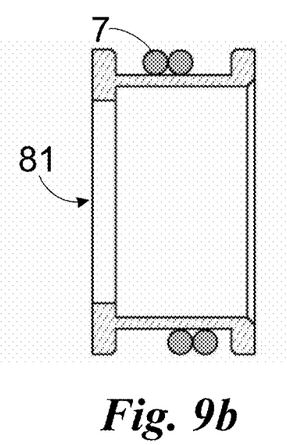
FIG. 9b shows a side view in cross-section of an alternative second device according to the invention.
Figure 9C:
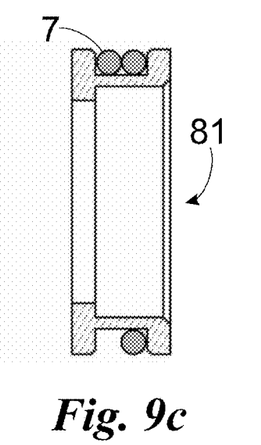
FIG. 9c shows a side view in cross-section of the preferred configuration of the second device according to the invention.

To overcome this problem, preferably the second device 81 is made according to the configuration shown in FIG. 9*c*.

The method of the tool system 1, described above in structural terms, is as follows.

In particular, when the localization apparatus 1b is attached to the machining surface 10a and the machine tool 1a moves over it, it is possible to assess, via a computer connected to the machine tool 1a and localization apparatus 1b, the positions adopted by the machine tool 1a on said machining surface 10a.

An important aspect to consider when moving the machine tool 1a is that, in the absence of localization apparatus 1b, it is possible to evaluate the movement in the reference system of the machine tool 1a, but no reference is given with respect to the object 10.

Supposing, for example, that the machine tool 1a is placed over a rectangular machining surface 10a it is possible to proceed to define the object reference system in the external computer.

To do this it is possible to follow different procedures which are partially described below.

For example it is possible to place a machine tool 1a preferably equipped with a detection apparatus 6 in the preferred configuration, or two detection apparatuses in the alternative configuration, over the machining surface 10a.

It is then possible to place two localization devices 1b over the surface and at the vertices thereof using the base 90 and the pointing device 91 defined by the emitter 91a.

It is also possible to connect the localization apparatus 1b to the object 10 using the connection device 92.

After connecting the localization apparatuses 1b, it is possible to connect, via the connection means present on the elements 60, 61, the cables 7 and 7a coming respectively from two localization apparatuses 1b to the machine tool 1a.

Alternatively it is possible to connect a single detection apparatus, 6, not comprising the second portion 61, and a localization apparatus 1b.

If instead the detection apparatus 6 is in the alternative configuration, the machine tool 1a preferably comprises two detection apparatuses 6 connected via two cables 7, 7a, respectively to two separate localization apparatuses.

During this step the amount of cable 7, 7a released by the first device 80 of each localization apparatus 1b is recorded so as to identify the distances L1, L2 between the machine tool 1a and the localization apparatuses 1b.

Preferably L1 and L2 correspond, for example, to the distances defined by the respective extraction of the detection cable 7 and/or the localization cable 7a from the respective localization apparatuses 1b.

Thanks to the third element 62 present on each detection apparatus 6 it is possible to find out the orientation of the machine tool 1a relative to the unwinding direction of the cable 7, 7a.

In particular, preferably, in the preferred configuration the third element 62 makes it possible to define the angle φ defined by the direction of the machine tool 1a in relation to the detection cable 7.

In the alternative configuration it is instead possible to directly find out the angle φ of orientation of the machine tool 1a compared to the cables 7, 7a connected to the detection apparatuses 6.

However it is still not effectively possible to find out the position of the machine tool 1a relative to the reference system of the machining surface 10a and, in particular, the localization apparatuses 1b.

In order to record the position of the localization apparatuses 1b, the machine tool 1a follows pre-determined paths 2a.

For example, the machine tool 1a can be moved along a 1×1 square or a right-angled isosceles triangle.

Figures 7, 8:
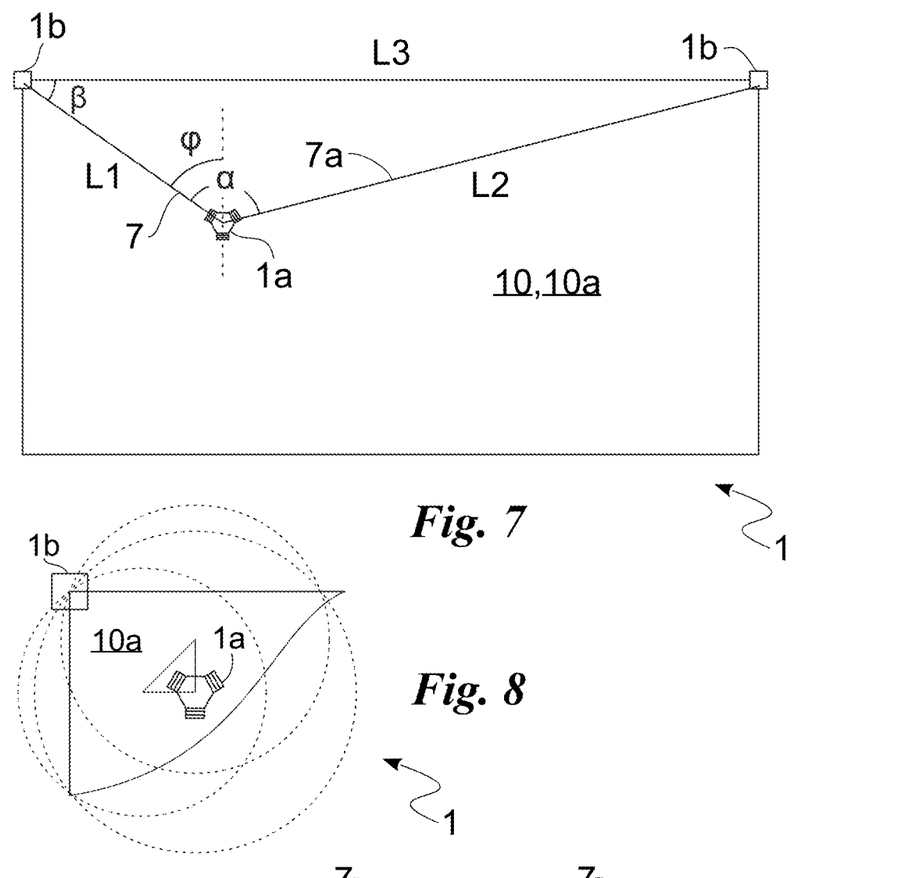
FIG. 7 is a view from above of the tool system according to the invention.
FIG. 8 is a view from above of the system during the localization step according to the invention.

Subsequent to this movement it is possible to detect the actual position of the vertices of the machining surface 10a from the intersection points following the logical procedure shown in FIG. 8.

As shown, once the actual distance between the machine tool 1a and localization apparatus 1b is known, the position of an apparatus 1b may be within the perimeter defined by the circumference whose radius corresponds to the distance between the machine 1a and apparatus 1b.

Once the circumferences obtained from the different positions adopted by the machine 1a along the predetermined path 2a have been intersected, it is possible to find the actual position of the apparatus 1b and therefore the orientation of the machine 1a in relation thereto by means of the detection apparatus 6.

Considering the data relative to the orientation of the cables 7, 7a by means of additional sensors placed between the elements 60, 61, or by measuring the orientation of the cables 7, 7a in relation to the two detection devices 6 of the alternative configuration in relation to the local reference system of the machine tool, it is possible to reconstruct the angle α between the two cables 7 and 7a.

Consequently, once known L1, L2 and α it is possible to use Carnot's theorem or the law of cosines to find the dimensional value L3 of the object 10 and, in the case in point, the side, or distance, between the localization apparatuses 1b with reference to the machining surface 10a.

From the data discovered it is then possible to determine the angle β between L3 and L1, and thus the actual coordinates a,b of the machine tool 1a, relative to the reference system of the object 10.

The following are examples of calculation which can be made by means of an electronic computer, based on the reasoning just described:

$$L3 = \sqrt{L1^2 + L2^2 - 2L1L2 \cos \alpha}$$

$$\beta = \sin^{-1}\left(\frac{L2}{L3} \sin \alpha\right)$$

$$a = L1 \cos \beta$$

$$b = L1 \sin \beta$$

Once the position of the machine tool 1a in relation to the two vertices of the machining surface 10a has been found for example, it is possible to disconnect one of the two localization apparatuses 1b from the machine tool 1a, move said apparatus 1b over another vertex and repeat the procedure previously described. It is thus possible to determine all the dimensions of the machining surface 10a, in the case in which it is rectangular, and define the coordinates and relative positioning between the machine tool 1a and the reference system relative to the object 10.

Alternatively to the above, the machine tool 1a may contain a plurality of detection apparatuses 6 and, more appropriately, a number equal to the number of localization apparatuses 1b used, even more than two.

In the case in which the machining surface 10a is still rectangular it is thus possible to use three localization apparatuses 1b and it is therefore no longer necessary to perform two steps, but it is possible to define the position of the machine tool 1a in the same step and using the logic expressed above.

The object 10, in particular the machining surface 10a, may be a shape other than rectangular used by way of example.

For example the machining surface 10a may have different or irregular or curvilinear shapes in the plane and out of plane.

It is possible in such cases to use a different number of localization apparatuses 1b and use different formulas and logics which take account of the possible geometry of the machining surface 10a in use.

For example, it is possible to implement on the computer suitable to interpret the data from the localization apparatus/es 1b and from the machine tool 1a calculation methods that take into account the curvilinear coordinates or different and selectable geometries.

The invention therefore comprises a new method of operation of said tool system 1.

The process comprises a step of preparing the tool system 1; a localization step of the machine tool 1a; and a removal step in which the driving means 3 move the machine tool 1a along the removal path 2a and in which the removal tool 2 removes material from the object 10 along the path 2a.

The preparation step preferably comprises a positioning step in which the machine tool is laid on the machining surface 10a and at least one localization apparatus 1b is arranged along fixed points defined preferably along the perimeter of the object 10, and a connection step in which one or more cables 7, 7a connect each localization apparatus 1b and the machine tool 1a.

In particular, as mentioned, the cable 7, 7a is released for example thanks to the intervention of a user, from the first device 80 and is connected to the machine tool 1a.

Preferably, therefore, the third device 82 of the localization apparatus 1b is preferably placed at the same height as the detection apparatus 6 so that the cable 7, 7a remains substantially within a plane parallel to the machining surface 10a, for example if the machining surface 10a is flat.

However, alternatively some parameters may be provided in the external computer such as to correct any misalignments and properly evaluate the distance between the machine tool 1a and localization apparatus 1b.

The definition of the path 2a can be run on the external computer following the localization of the machine tool 1a on the machining surface 10a.

The machine tool 1 is thus ready to perform the subsequent step.

The localization step of the machine tool 1a with respect to at least one localization apparatus 1b then begins.

During the localization step preferably the machine tool 1a performs a moving step in which it travels along a predetermined path 2a defining the localization point of at least one localization apparatus 1b.

Moreover, in the localization process a computer preferably performs a processing step in which it receives data relative to the position and distances of the localization apparatus 1b and the machine tool 1a.

In particular, in this step, the computer processes at least the data relative to the distance between the machine 1a and at least one apparatus 1b coming from the localization portion 8, more specifically from the first device 80, and the data relative to the orientation of the machine 1a coming from the control unit 5, more specifically, from the detection apparatus 6.

Preferably the processor detects the data mentioned above in relation to at least two localization apparatuses connected to a machine tool 1a so as to localize, as described above, the position and orientation of the machine tool relative to the reference system of the object 10, i.e. relative to the latter.

At the end of the localization step the removal step preferably begins in which the driving means 3 move the machine tool 1 along the removal path 2a while virtually simultaneously the removal tool 2 removes material from the object 10 along the path 1a performing the machining.

In detail, during the removal step, the unit 5, depending on the commands provided by a user through a computer, enables/disables the driving wheels varying the advancement of the machine tool 1a in a manner concordant with the path 2a.

For example, if the removal path 2a provides for a straight portion virtually parallel to one of the main axes of rotation 3a, the unit 5 controls the stopping of the wheel with its axis parallel to said direction and a concordant rotation and of the same modulus as the remaining wheels; while if the path provides for an arched portion, the control unit 5 commands a discordant rotation and of the same modulus of two wheels leaving the third immobile.

Once the removal step is completed, the machining process can end or, alternatively, provide for an additional material removal phase in which the driving means 3 move the machine tool 1a at least one additional time along said material removal path 2a and the removal tool 2 removes material from the object 10 again along the path 2a increasing the thickness of the removed material and preferably, cutting the object 10.

It must be stressed lastly that, during the removal step or additional removal step, the movement of the machine tool 1a can be performed manually by the operator thanks to the handles.

Simultaneously to the steps above a corrective step may be performed. At this stage the computer evaluates the difference between the quantity of cable 7, 7a released by the first device 80 and the amount of cable 7, 7a measured by the fourth device 83.

If the difference exceeds a threshold value, which can be preset or manually set, then the system 1 is reactivated by the computer so as to bridge the error.

In particular the control unit 5 can move the machine tool 1a so as to place the cable 7, 7a in tension.

The tool system and method of operation of said tool system 1 according to the invention achieves important advantages.

A first important advantage of the machine tool 1 with respect to those known up to now is to be identified in that it is able to perform a machining operation on any size of surface taking into account the geometry of said surface.

In fact the invention allows the measurement of the relative position between the machine tool 1a and the object 10 being machined and can thus provide instructions to the machine tool in real time and with absolute precision with respect to the surface.

In addition, being positioned on the object 10 and able to move without restrictions along the entire machining surface 10a, it is capable of working substantially unlimited surfaces. Such a possibility is denied in known machines where the machining stroke is limited by the stroke of the piece-holder table and/or the spindle.

Another advantage is the reduced overall dimensions of the tool system 1, which, therefore, constitutes an innovative small tool, portable and utilisable anywhere, to realize large-sized items.

A different advantage is that, in contrast to the known machine tools, the use of the tool system 1 is extremely safe.

In fact, even in case of manual movement, the arrangement of the tool 23 makes it possible to conceal and make access to the cutting area difficult.

Another advantage is that the tool system 1, following a removal path 2a ordered by an external computer is able to perform a very precise and accurate machining.

A further advantage is that, it being possible to perform multiple passages along exactly the same path 2a, it is also possible to perform cutting operations.

An important advantage, especially with respect to the known machines with numerical control, is identifiable in that the tool system 1 is also usable by an operator with no specific knowledge.

Another advantage is given by the presence of the movers which, by translating and rotating the removal tool 2 with respect to the machining surface 10a, make it possible to vary, even during the same passage, the depth of removal of material and the inclination of the slot with respect to the surface 10a.

Another advantage of no less importance is the constructional simplicity of the tool system 1, making for a reduced purchase price and maintenance costs.

Variations may be made to the invention without departing from the scope of the inventive concept defined in the claims.

In said sphere all the details may be replaced with equivalent elements and the materials, shapes and dimensions may be as desired.

The invention claimed is:

1. A tool system, comprising:
 a machine tool configured for machining by removing material from an object comprising a machining surface,
 said machine tool comprising:
  a removal tool,
  driving means configured to be placed directly in contact with said machining surface and further configured to move said machine tool and, thus, said removal tool, with respect to said object while said removal tool removes material from said object, and
  a control unit for controlling said driving means,
 said tool system further comprising a computer and a localization apparatus, the localization apparatus comprising a support portion and a localization portion, said support portion configured to be placed at a fixed point of said machining surface, said localization portion being connected to said machine tool by means of a cable that is configured to allow localization of said machine tool on said machining surface,
 wherein said computer processes data corresponding to at least a distance between the machine tool and said localization portion and an angle of the machine tool, said distance corresponding to a measured length of said cable released by said localization apparatus, and
 said machine tool further comprising a detection apparatus configured to receive or release said cable, and the angle of the machine tool is measured by said detection apparatus, said angle extending between a predetermined direction of the machine tool and a direction defined by said cable.

2. The tool system according to claim 1, further comprising a second localization apparatus, said localization apparatus, said second localization apparatus, and said machine tool being operatively connected to the computer.

3. The tool system according to claim 1, wherein said detection apparatus defines a first axis and including a shaft centered along said axis, and said cable is configured to rotate about said shaft.

4. The tool system according to claim 3, wherein said machine tool further comprises a first element movably connected to said shaft and configured to be moved integrally with said cable and defining said angle between the predetermined direction of said machine tool and said cable.

5. The tool system according to claim 4, wherein said machine tool further comprises a second element movably connected to said shaft and configured to be moved by a second cable, said first and second elements defining an angular deviation there between.

6. The tool system according to claim 5, wherein said detection apparatus comprises a third element configured to detect said angle of said machine tool and comprising at least one portion configured to move integrally with at least one of said first element and said second element and further configured to detect the movements of the at least one of said first element and said second element.

7. The tool system according to claim 3, wherein said machine tool further comprises a first element and a second element, said first element being connected to said shaft, said second element being movably connected to said shaft and configured to be moved integrally with said cable, said first and second elements defining a transmission pulley of said cable.

8. The tool system according to claim 7, wherein said detection apparatus comprises a third element configured to detect the angle of said machine tool with respect to the direction of said cable, said third element comprising at least one portion configured to move jointly with said second element and configured to detect the movements of said second element.

9. The tool system according to claim 1, wherein said support portion comprises a base and a pointing device, said base defining a support surface compatible with said machining surface and said pointing device including at least one emitter configured to mark one or more points on said support surface.

10. The tool system according to claim 1, wherein said localization portion comprises a frame, a first device, a second device and a third device, said first, second, and third devices being connected to said frame and mutually connected to said cable, said first device configured to receive or release said cable in opposition to or pushed by an elastic element, said second device comprising a transmission device configured to allow the passage of said cable from said first device to said third device and said third device configured to allow the release or receipt of said cable by said localization apparatus.

11. The tool system according to claim 10, wherein said localization portion comprises a fourth device and said cable comprises a plurality of markers configured to define local points spaced along said cable, said fourth device configured to detect said plurality of markers.

* * * * *